United States Patent
Forsbach

(10) Patent No.: US 7,793,171 B2
(45) Date of Patent: Sep. 7, 2010

(54) PROTOCOL TESTER AND METHOD FOR PERFORMING A PROTOCOL TEST

(75) Inventor: Juergen Forsbach, Berlin (DE)

(73) Assignee: Tektronix, Inc., Beaverton, OR (US)

( * ) Notice: Subject to any disclaimer, the term of this patent is extended or adjusted under 35 U.S.C. 154(b) by 313 days.

(21) Appl. No.: 11/927,301

(22) Filed: Oct. 29, 2007

(65) Prior Publication Data
US 2008/0294948 A1    Nov. 27, 2008

(30) Foreign Application Priority Data
Nov. 6, 2006    (EP)    ................................. 06023053

(51) Int. Cl.
*G06F 11/00*    (2006.01)
(52) U.S. Cl. .................... 714/704; 714/25; 714/48; 714/715; 714/716; 714/717; 714/733; 714/734; 714/736; 455/67.11; 455/67.14; 455/155.1; 455/115.2; 455/12.1; 455/423; 455/426.1; 455/426.2; 455/226.1; 375/224; 375/228; 370/241; 370/242; 370/248; 370/249; 370/333
(58) Field of Classification Search ........................ None
See application file for complete search history.

(56) References Cited

U.S. PATENT DOCUMENTS

| | | | | |
|---|---|---|---|---|
| 5,581,577 A | * | 12/1996 | Abe | ........................... 375/225 |
| 5,920,608 A | * | 7/1999 | Minegishi | ................. 379/15.01 |
| 6,233,709 B1 | * | 5/2001 | Zhang et al. | ................. 714/774 |
| 7,500,167 B2 | * | 3/2009 | Widdup | ....................... 714/752 |
| 2005/0075103 A1 | * | 4/2005 | Hikokubo et al. | ........... 455/423 |
| 2005/0235178 A1 | * | 10/2005 | Starr et al. | ................... 714/704 |
| 2006/0200708 A1 | * | 9/2006 | Gentieu et al. | .............. 714/704 |
| 2007/0162788 A1 | * | 7/2007 | Moelker | ..................... 714/704 |

OTHER PUBLICATIONS

Tektronix, Inc., "WiMAX Testing on the K1297-K35 Platform," Oct. 2006.
Tektronix, Inc., "K1297-K20 Monitor Protocol Tester, Short Introduction for Version 3.00," Apr. 2004.
Tektronix, Inc., "K1297-K20 Monitor Protocol Tester, User Manual," Jun. 2004.
European Patent Office, Search Report for Application No. 06023053.9 (published with EP 1 919 130 A1), May 7, 2008.

* cited by examiner

*Primary Examiner*—John P Trimmings
(74) *Attorney, Agent, or Firm*—Matthew D. Rabdau; Michael J. Fogarty, III

(57) ABSTRACT

Embodiments of the present invention provide a protocol tester for performing a protocol test, said protocol tester exhibiting an input for the feeding in of data, a protocol decoding device for the decoding of data, and an output for providing the decoded data, the protocol tester also comprising a device for measuring the bit error rate. A corresponding method for performing a protocol test is also provided.

17 Claims, 2 Drawing Sheets

PROTOCOL TESTER AND METHOD FOR PERFORMING A PROTOCOL TEST

BACKGROUND

Embodiments of the present invention relate to a protocol tester for performing a protocol test, said protocol tester exhibiting an input for the feeding in of data, a protocol decoding device for the decoding of data, and an output for providing the decoded data. They also relate to a corresponding method for performing a protocol test.

Preparations by the mobile radio industry for the transition to 3G are increasingly taking shape. UMTS and CDMA2000 are third generation (3G) technologies that have emerged as a result of the demand for more mobile bandwidth and new services, and, with these characteristics, have the potential for opening up new sources of income. The new 3G network elements, interfaces and protocols will pose new challenges for installation technicians and network operators. In contrast to the 2G technology, where standards are well known and consolidated, interoperability problems can often no longer be resolved with existing protocol monitors.

With the introduction of 3G, new elements have to be installed practically everywhere in the network—probably by different providers. Equipment developers interpret the new 3G specifications and standards in good faith, yet there will inevitably be different solutions and diverging implementations between the manufacturers. The result will be compatibility problems, e.g. when a new Radio Network Controller (RNC) or Base Station Controller (BSC) of supplier A is connected to an Mobile Switching Center (MSC) of supplier B. Until 3G interoperability between different manufactures is well established and understood in all aspects, a check, start-up, error diagnosis and acceptance will be more complicated than ever. Furthermore, future standards and protocols will likely introduce new, but similar interoperability issues. According to the prior art, the protocol test methods used in this process can be subdivided into three main categories:

Monitoring: This is the simplest method of protocol testing. It is a proven means for many protocol and interoperability problems, particularly in established 2G networks. A protocol monitor is usually not intrusive; it records messages, decodes them and displays them in a readable form. A monitor can draw attention to signaling errors, but it cannot interpret the recorded parameters and values in their specific context, i.e. specify the cause of the error. Monitoring tools are available as compact, low-priced configurations for local use.

Simulation and emulation: A protocol simulator/emulator assumes the function of a network element and is therefore considered an intrusive measuring tool. Depending on the configuration it can, just like the missing element, generate protocol messages and respond to messages received. Simulators/emulators are more complex to configure, but some apparatuses dispose of aids with which the test configurations can be defined in a simple manner. Until now protocol simulators/emulators have been more complex, expensive and bigger than monitoring tools. This, however, has changed drastically with the most recent trends.

Conformity test: This is the performing of pass/fail tests with predefined test cases. A conformity test is often used for the acceptance of newly installed network elements and requires a simulator/emulator.

As already mentioned, it will most likely be inevitable for 2.5 and 3G installations to check the interoperability between elements of different apparatus manufacturers. The interfaces between the network elements are mostly "open". This means that a network operator can, for example, procure an MSC from one supplier and the BSC/ Base Transceiver Station (BTS) pair or the RNC from a second supplier. On the one hand, this promotes healthy competition, but, on the other hand, it also complicates the installation and testing process.

Apart form the interoperability problem explained above, the next question is how the two local providers should be coordinated. Only rarely do two installation teams—one for the MSC and one for the BSC/BTS or RNC—work side by side and perform their task simultaneously. What occurs far more frequently is that one team finishes its work some days or even weeks before the other and wants to bring the order to a conclusion with an acceptance test that should occur as quickly as possible.

But how is the supplier of the BSC/BTS or RNC to prove the conformity and interoperability of its installation without an MSC? For this one needs a replacement MSC—a test apparatus that behaves like a real, fully conforming, functional MSC. Such a tool is, of course, the protocol simulator/emulator. It can take the place of the missing element, act together with the network, simulate flawed behavior, control the signaling and the message content and record the results of all of these processes. Thanks to the recent advancements in test and measurement technology, all these features can be integrated into a single compact apparatus for local use.

In summary, the persons dealing with the start-up of a network or the installation of new network components are thus confronted with tasks that are characterized by a high complexity and, what is more, have to be resolved under great time pressure, particularly locally.

Apart from the so-called protocol testers, whereby in the present application this term must be understood as comprising apparatuses for the purpose of monitoring, simulating, emulating and for performing conformity tests, there are known so-called BER (Bit Error Rate) testers. In this process, the bit error rate is a measure of the quality of the transmission on digital transmission paths of communication technology and network technology. Thus the bit error rate describes the ratio of the number of incorrectly transmitted bits in comparison to the total number of bits transmitted. For a measurement of the bit error rate there always has to exist a transmitter that generates a defined test pattern, and there has to be a receiver that evaluates this result and displays the result. In this process the measurement configuration can look very differently: if only one's own connection is examined, one works, for example, with a self-call. If, however, a complete transmission path has to be looked at, then an end-to-end measurement is carried out. In addition, both variants can work with loops, with the aid of which the test bit pattern is again sent back to the transmitter. In this case the transmitter and the receiver are one unit.

SUMMARY

Accordingly, embodiments of the present invention are provided to further develop the aforementioned protocol tester and the aforementioned method in such a way that the testing, start-up, error diagnosis and acceptance of telecommunication networks locally is improved further while there is as little extra effort as possible. In particular, the improvement is to consist in enabling the persons entrusted with the performance to gain the required findings even faster.

Embodiments of the present invention are based on the realization that the persons entrusted with the performance of the tests can gain insights about the communication network to be tested or the communication apparatus to be tested even more quickly if the protocol tester also comprises a device for measuring the bit error rate. While in the prior art two separate apparatuses had to be connected to the network to be tested, with a separate power supply and a separate coupling having to be made available for each apparatus, a protocol tester according to the present invention only needs one power supply and one single connection to the network to be tested. In this way the interferences induced onto the network by the protocol tester are significantly reduced, the connection effort is halved. Locally only a single apparatus is needed, the total effort is thus halved.

In an embodiment of the present invention, two different aspects can be correlated with each other for an assessment of the quality of a network. On the one hand the bit error rate, which is dependent on the quality of the transmission channel, can be considered. If the values of the bit error rate are too high, a flawless usage of the transmission channel is no longer possible. The network element manufacturer or the network operator has to find the causes of the excessively high bit error rate values. However, and this is taken into consideration with an embodiment of the present invention, the transmission quality is not only dependent on the topology but also on the type of use of the network element(s) or channel(s) available, for example the number of the simultaneously active user, on the other hand. Another factor could be unnecessary handovers between neighboring cells. Through embodiments of the present invention, these different causes of quality loss in a network can be reliably correlated with each other, be compared with each other and be jointly evaluated to improve the quality of the network in processes requiring much less time than known from prior art.

Normally, the protocol tester comprises a protocol stack having several protocol layers, the first protocol stack layer that is normally formed by the physical layer, being coupled to the input for the feeding in of data, the protocol decoding device and the device for measuring the bit error rate being coupled to a protocol stack layer that is arranged higher in the protocol stack than the first protocol layer. This means that the protocol-decoding device and the device for measuring the bit error rate, starting from the bottom-most protocol layer, jointly use several elements of the protocol stack. Said jointly used elements therefore only have to be provided once. They only have to be installed, configured, maintained and updated once. This leads to a further reduction of the effort. Synchronization and framing functions of the receipt software, for example, can be used jointly. They ensure that the protocol tester according to the present invention synchronizes itself to the data stream and forms data packets. Also jointly used are so-called reassemblers, which comprise auxiliary functions for the protocol layers, which deal with decoding. In an embodiment of the present invention, the protocol decoding device and the device for measuring the bit error rate are therefore coupled to the second, third and/or fourth protocol layer of the protocol stack.

In a further embodiment, the protocol tester comprises a trigger device designed to trigger, upon the occurrence of a trigger condition, at least one action relating to the protocol decoding device and/or the device for measuring the bit error rate. In this process the trigger condition is preferably connected with the occurrence of at least one event in the decoded data, particularly with the occurrence of at least one predeterminable message and/or at least one predeterminable parameter and/or at least one predeterminable value.

In this process the action can be the activation of the device for measuring the bit error rate or the deactivation of the device for measuring the bit error rate and/or the protocolling of the current bit error rate value, which is provided by the device for measuring the bit error rate, and/or the activation of a predeterminable display on a display device.

Alternatively, the trigger condition can also be the occurrence of a predeterminable bit error rate value, which is provided by the device for measuring the bit error rate. The action can then be the activation of the protocol decoding device or the deactivation of the protocol decoding device and/or the protocolling of the reaching of the predeterminable value of the bit error rate and/or the activation of a predeterminable display on a display device.

In summary this enables an automatic correlation of the measurement data. If the BER value increases and an increased number of calls are shown, then this can be an important clue for the manufacturer or the network operator. The same also applies vice versa for the number of handovers or the opening of broadband channels. In normal operation, the so-called trace files, which, according to the prior art, are kept separately for the device for measuring the bit error rate and the protocol tester with the protocol-decoding device, very quickly assume unmanageable sizes. Firstly, the trigger function provides the possibility of significantly reducing the data volume recorded, secondly, the occurrences of error cases can be found much more quickly, and, thirdly, a correlation between the protocol contents and the associated bit error rate can be established much more easily.

Preferably, the device for measuring the bit error rate exhibits an output, at which at least one value of a measured bit error rate is provideable, the protocol tester also comprising a storage device, which is designed to store the decoded data together with the at least one associated value of the measured bit error rate. This makes an analysis at a later point in time much easier. The two result files underlying a measurement are merged into a single file. This way, there is made possible the possibility of an automatic analysis, decoupled from the point in time of the performance of the test, largely without control by an operator.

Preferably, the protocol tester also comprises a control device for a display device, the control device being coupled with the protocol decoding device and the device for measuring the bit error rate, and being designed to provide, at its output, a signal for the display device, said signal comprising the simultaneous display on the display device of at least one output signal of the protocol decoding device and at least one output signal of the device for measuring the bit error rate. This opens up the possibility to display, on a display, in particular simultaneously, both the results of the protocol decoding device and the results of the device for measuring the bit error rate, and hence enable the operator to correlate them to each other in a simple and reliable way. As this also opens up the possibility to design the display of the different results in a mutually dependent way, this results in a significant improvement of the work environment of the operators entrusted with the performance of the aforementioned tests. Quick analysis and trouble shooting is thus made possible.

In the following, one embodiment of a protocol tester according to the present invention will be described in more detail with reference to the drawings attached.

DETAILED DESCRIPTION

Figure 1:
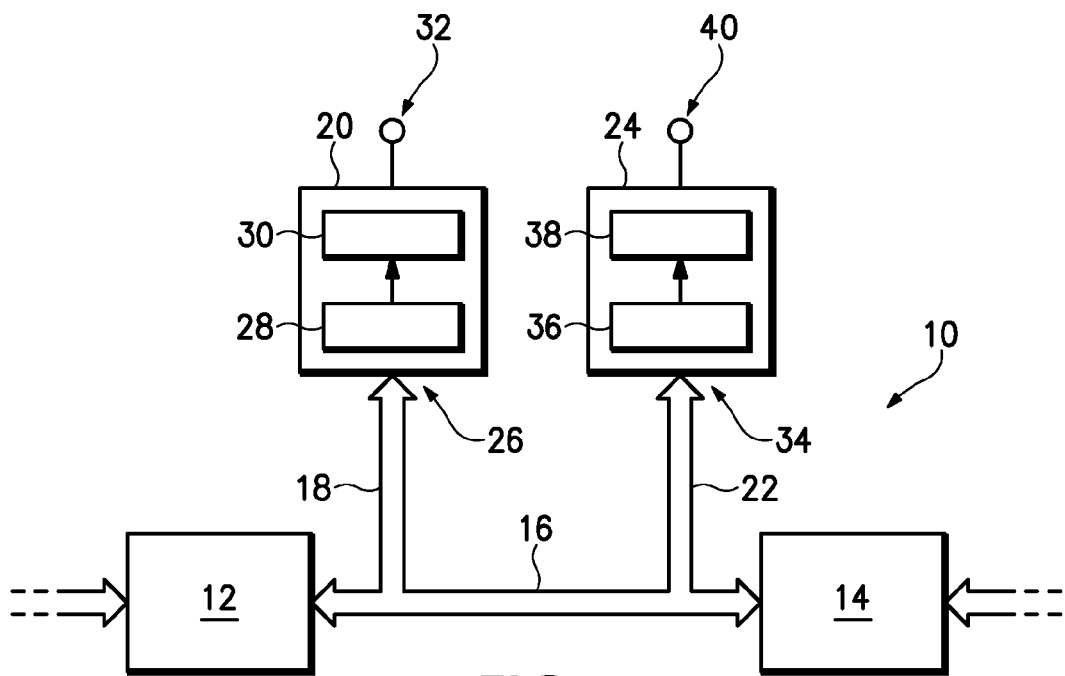
FIG. 1(Prior Art) illustrates an arrangement, known from the prior art, for performing a protocol test and a test relating to the measurement of the bit error rate.

FIG. 1 shows an arrangement, known from the prior art, for testing a telecommunication network 10, which comprises several network elements, with two network elements 12, 14 being shown as an example in the present case. To the connecting line 16 between the two network elements 12, 14 there is connected, on the one hand, via a connecting line 18, a protocol tester 20, and, on the other hand, via a connecting line 22, a device 24 for measuring the bit error rate. The protocol tester 20 exhibits an input 26 via which the data are fed in. Said data are first conveyed to a device 28 for signal processing, which relays its output signal to a block 30 having a protocol-decoding device. At an output 32 the decoded data are made available for further processing, for example, for displaying them on a display device or making them available to a storage device. The device 24 for measuring the bit error rate exhibits an input 34 via which the data are also fed in. It comprises a block 36 for signal processing, which conveys its output signal to a block 38 for the actual determination of the bit error rate. The results are made available at an output 40 for further processing.

Figure 2:
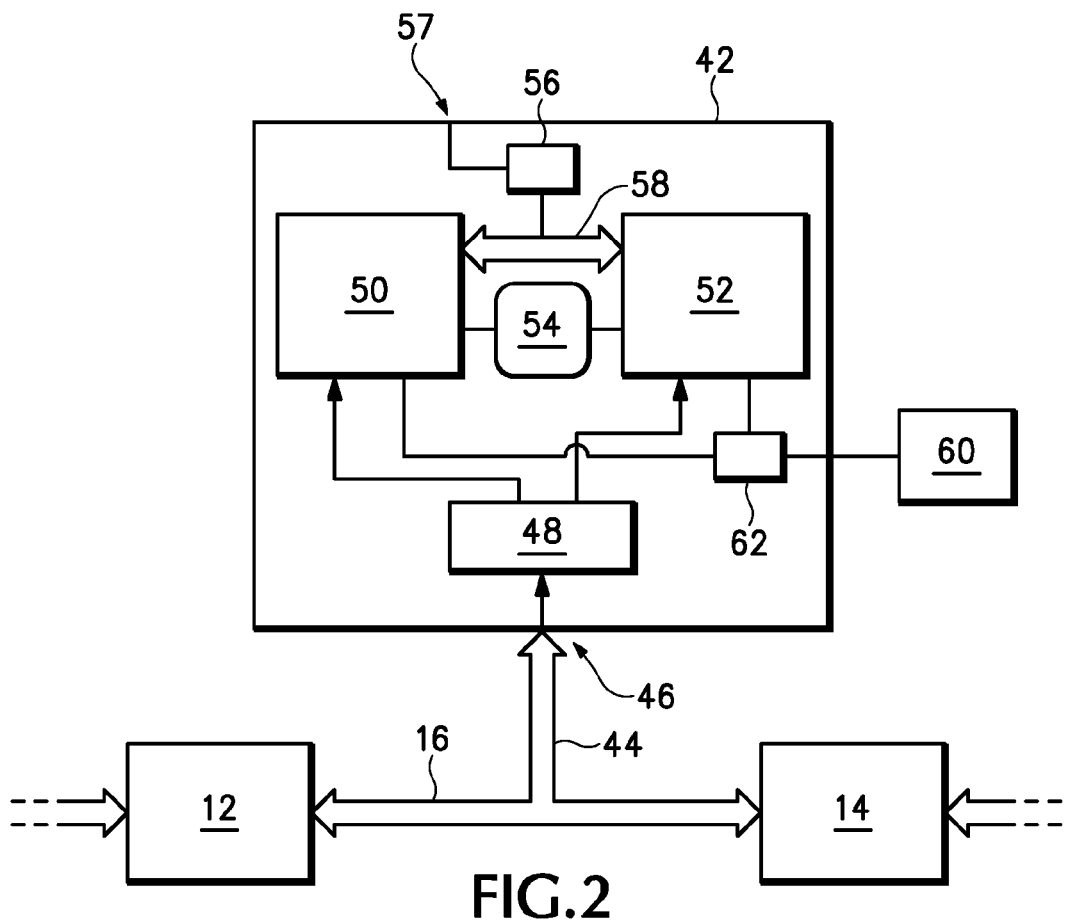
FIG. 2 is a schematic representation of the configuration of a protocol tester according to an embodiment of the present invention.

FIG. 2 shows the configuration of a protocol tester according to the present invention, with building elements corresponding to those of FIG. 1 being assigned the reference numeral already introduced in connection with FIG. 1. The protocol tester according to the present invention carries the reference numeral 42 and is coupled, via a line 44, to line 16. It exhibits an input 46 for feeding in data, said input being first coupled to a block 48 for signal processing. Block 48 is provided only once and is coupled, on the one hand, with a protocol-decoding device 50, on the other hand, with a block 52 for determining the bit error rate. The blocks 50 and 52 are both coupled with a common recording file, a so-called trace file 54, into which there are entered both the results of the block 50, and the results of the block 52. A trigger device 56, which, as indicated by the double arrow 58, can access in a controlling fashion, both block 50 and block 52. The trigger device 56 exhibits an interface 57 via which the respective trigger condition or the respective trigger conditions can be defined by an operator. The trigger device 56 is designed to trigger, upon the occurrence of a trigger condition, at least one action relating to the protocol decoding device 50 and/or the block 52 for measuring the bit error rate. In this process its is possible, for example, for the trigger condition to be linked to the occurrence of at least one event in the data decoded by block 50, particularly to the occurrence of at least one predeterminable message and/or at least one predeterminable parameter and/or at least one predeterminable value. In this process the action can in particular be the activation of block 52 for measuring the bit error rate or the deactivation of block 52 for measuring the bit error rate and/or the protocolling of the current the bit error rate value, which is provided by block 52 for measuring the bit error rate, in the trace file 54, and/or the activation of a predeterminable display on a display device 60. In this process the display device 60 is coupled via a control device 62 with block 50 for protocol decoding and block 52 for measuring the bit error rate and designed therefor, with the control device 62 being designed to provide at the output a signal for the display device 60, which comprises the simultaneous or alternating display on the display device 60 of at least one output signal of block 50 and at least one output signal of block 52.

The trigger condition can, however, also be coupled with the occurrence of a predeterminable bit error rate value, which is provided by block 52, and, in this process, the action can be the activation of block 50 or the deactivation of block 50 and/or the protocolling of the reaching of the predeterminable value of the bit error rate and/or the activation of a predeterminable display on the display device 60.

The trace file 54 is designed to store results, which belong together, of block 50 and block 52, for example the decoded data, together with at least one associated value of the measured bit error rate.

Figure 3:
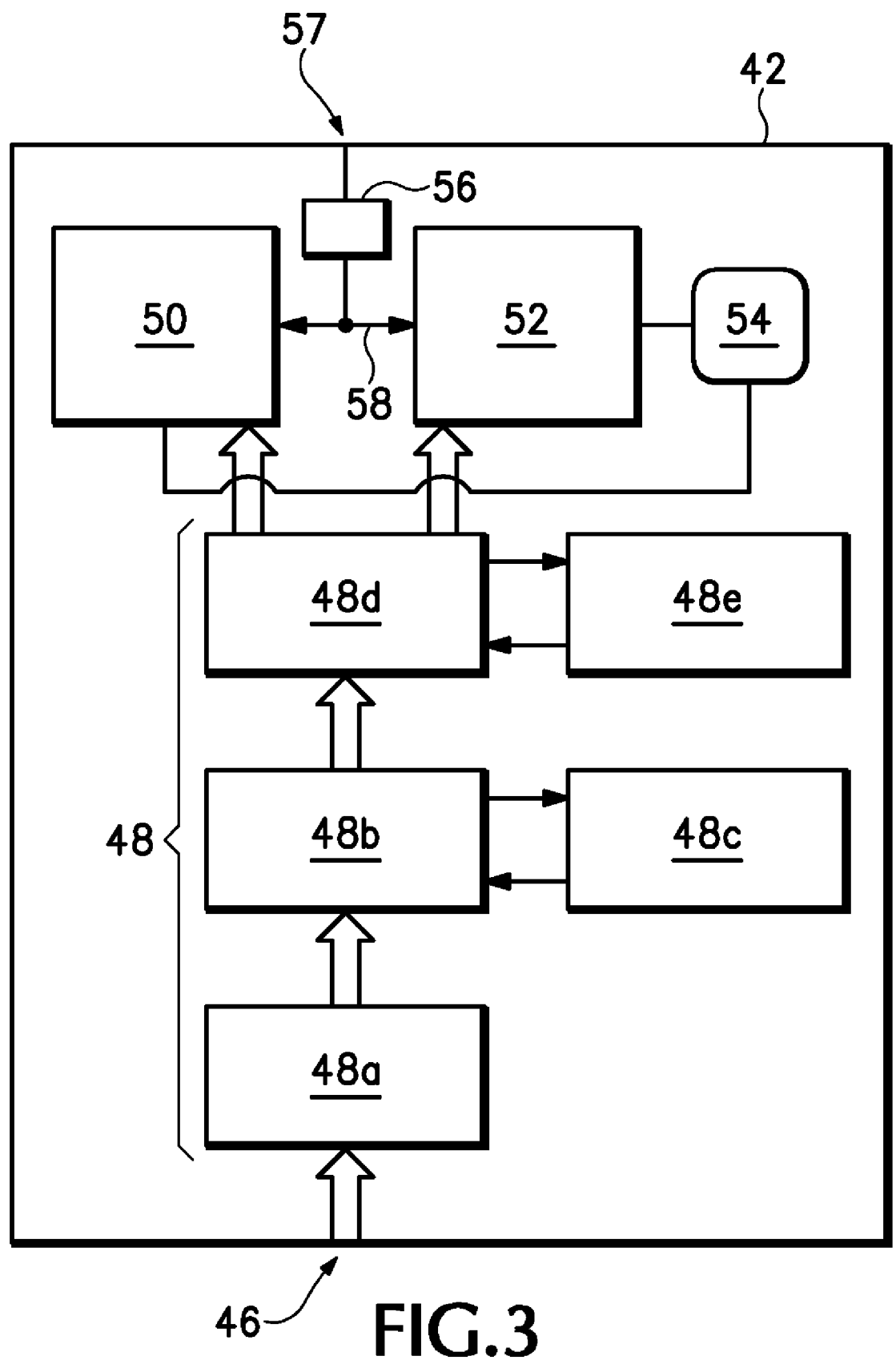
FIG. 3 is a schematic representation the configuration of a protocol tester according to an embodiment of the present invention, with the device for signal processing being shown in greater detail.

FIG. 3 shows in a detailed representation the configuration of a protocol tester 42 according to an embodiment of the present invention. It shows in particular in greater detail for one embodiment the configuration of block 48 for signal processing of FIG. 2. FIG. 3 makes clear how elaborate the approach according to the prior art, see FIG. 1, was. There, the signal processing in both signal processing blocks 28, 36 had to be loaded, configured, maintained and updated according to the relevant standard as for example WiMAX, UMTS, etc. In the case of embodiments the present invention the effort is halved because block 50 and block 52 jointly use several protocol layers of the protocol stack, which is reflected in the signal processing 48. In the present example of a realization for the WiMAX standard, block 48a, for example, corresponds to the Level 2 method, which embodies synchronization and framing functions. This way the protocol tester 42 is enabled to synchronize itself to the data stream at the input 46 and to form data packets. In the embodiment, block 48b corresponds to a decoder step 1 and block 48c to a reassembler step 1, wherein there are transported from block 48b data of the corresponding protocol layer to block 48c and retransferred from block 48c in a reassembled form back to block 48b. In the embodiment, block 48d corresponds to a decoder step 2 and block 48e to a reassembler step 2. Block 48d in turn transfers data of the corresponding protocol layer to block 48e, while block 48e transfers, again in a reassembled form, to block 48d. With regard to the OSI reference model there are coupled, in the present case, block 50 and block 52 with the third protocol layer of the protocol stack of the signal processing 48. In other embodiments, this can also be the second protocol layer or the fourth or an even higher protocol layer.

What is claimed is:

1. An apparatus for performing a protocol test comprising:
    a protocol tester exhibiting an input for receiving data, a protocol decoding device for the decoding the data, and an output for providing the decoded data; and
    a device for measuring a bit error rate;
    wherein the protocol tester comprises a protocol stack having several protocol layers, a first protocol layer of the protocol stack being coupled with the input for the feeding in of the data, the protocol decoding device and the device for measuring the bit error rate being coupled with a second, third or fourth protocol layer of the protocol stack, said second, third or fourth protocol layer being arranged higher in the protocol stack than the first protocol layer.

2. The apparatus according to claim 1, wherein the protocol tester further comprises a trigger device, which is designed to trigger, upon the occurrence of a trigger condition, at least one action relating to the protocol decoding device or the device for measuring the bit error rate.

3. The apparatus according to claim 1, wherein the device for measuring the bit error rate exhibits a second output, at which there is provideable at least one value of a measured bit error rate, the protocol tester also comprising a storage device, which is designed to store the decoded data together with the at least one associated value of the measured bit error rate.

4. The apparatus according to claim 1, wherein the protocol tester also comprises a control device for a display device, the control device being coupled to the protocol decoding device and the device for measuring the bit error rate and being designed to provide, at its output, a signal for the display device, said signal comprising a simultaneous display, on the display device, of at least one output signal of the protocol decoding device and at least one output signal of the device for measuring the bit error rate.

5. The apparatus according to claim 2, wherein the trigger condition is linked with the occurrence of at least one event in the decoded data, particularly with the occurrence of at least one predeterminable message or at least one predeterminable parameter or at least one predeterminable value.

6. The apparatus according to claim 2, wherein the at least one action is the activation of the device for measuring the bit error rate or the deactivation of the device for measuring the bit error rate or the protocolling of the current bit error rate value, which is provided by the device for measuring the bit error rate, or the activation of a predeterminable display on a display device.

7. The apparatus according to claim 6, wherein the trigger condition is linked with the occurrence of a predeterminable bit error rate value, which is provided by the device for measuring the bit error rate.

8. The apparatus according to claim 5, wherein the at least one action is the activation of the device for measuring the bit error rate or the deactivation of the device for measuring the bit error rate or the protocolling of the current bit error rate value, which is provided by the device for measuring the bit error rate, or the activation of a predeterminable display on a display device.

9. The apparatus according to claim 5, wherein the trigger condition is linked with the occurrence of a predeterminable bit error rate value, which is provided by the device for measuring the bit error rate.

10. The apparatus according to claim 8, wherein the trigger condition is linked with the occurrence of a predeterminable bit error rate value, which is provided by the device for measuring the bit error rate.

11. The apparatus according to claim 10, wherein the at least one action is the activation of the protocol decoding device or the deactivation of the protocol decoding device or the protocolling of the reaching of the predeterminable value of the bit error rate or the activation of the predeterminable display on a display device.

12. The apparatus according to claim 11, wherein the device for measuring the bit error rate exhibits a second output, at which there is provideable at least one value of a measured bit error rate, the protocol tester also comprising a storage device, which is designed to store the decoded data together with the at least one associated value of the measured bit error rate.

13. The apparatus according to claim 11, wherein the protocol tester also comprises a control device for a display device, the control device being coupled to the protocol decoding device and the device for measuring the bit error rate and being designed to provide, at its output, a signal for the display device, said signal comprising a simultaneous display, on the display device, of at least one output signal of the protocol decoding device and at least one output signal of the device for measuring the bit error rate.

14. An apparatus for performing a protocol test comprising:
a protocol tester exhibiting an input for receiving data, a protocol decoding device for the decoding the data, and an output for providing the decoded data
a device for measuring a bit error rate; and
a trigger device, which is designed to trigger, upon the occurrence of a trigger condition, at least one action relating to the protocol decoding device or the device for measuring the bit error rate, wherein the trigger condition is linked with the occurrence of a predeterminable bit error rate value, which is provided by the device for measuring the bit error rate.

15. The apparatus according to claim 14, wherein the at least one action is the activation of the protocol decoding device or the deactivation of the protocol decoding device or the protocolling of the reaching of the predeterminable value of the bit error rate or the activation of a predeterminable display on a display device.

16. A method for performing a protocol test using a protocol tester exhibiting an input for the feeding in of data, a protocol decoding device for the decoding of the data and an output for providing the decoded data, the protocol tester also comprising a device for measuring the bit error rate, comprising the steps of:
a) decoding of the data by means of the protocol decoding device;
b) measuring of a bit error rate by means of the device for measuring the bit error rate; and
c) triggering, upon the occurrence of a trigger condition, at least one action relating to the protocol decoding device or the device for measuring the bit error rate, wherein the trigger condition is linked with the occurrence of a predeterminable bit error rate value, which is provided by the device for measuring the bit error rate.

17. The method according to claim 16, wherein after the occurrence of a trigger condition there is triggered an action relating to step a) or step b).

* * * * *